(12) United States Patent
Chinnakkonda Vidyapoornachary et al.

(10) Patent No.: US 9,436,401 B1
(45) Date of Patent: Sep. 6, 2016

(54) COMPUTER MEMORY DATA SECURITY

(71) Applicant: International Business Machines Corporation, Armonk, NY (US)

(72) Inventors: Diyanesh B. Chinnakkonda Vidyapoornachary, Bangalore (IN); Ray C. Laning, Kasson, MN (US); Tony E. Sawan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/092,654

(22) Filed: Apr. 7, 2016

Related U.S. Application Data

(63) Continuation of application No. 14/665,029, filed on Mar. 23, 2015.

(51) Int. Cl.
*G06F 3/06* (2006.01)

(52) U.S. Cl.
CPC ........... *G06F 3/0623* (2013.01); *G06F 3/0652* (2013.01); *G06F 3/0673* (2013.01)

(58) Field of Classification Search
CPC ... G06F 3/0623; G06F 3/0652; G06F 3/0673
See application file for complete search history.

(56) References Cited

U.S. PATENT DOCUMENTS

| | | | |
|---|---|---|---|
| 6,793,408 B2 | 9/2004 | Levy et al. | |
| 7,251,747 B1 | 7/2007 | Bean et al. | |
| 7,898,855 B2 | 3/2011 | Merry, Jr. et al. | |
| 8,134,875 B2 | 3/2012 | Baxter | |
| 8,456,858 B2 | 6/2013 | Liang et al. | |
| 8,489,936 B2 | 7/2013 | Gower et al. | |
| 8,636,528 B2 | 1/2014 | Sass et al. | |
| 8,832,402 B2 | 9/2014 | Goss et al. | |
| 9,043,943 B1* | 5/2015 | Ramarao | G06F 21/10 726/29 |
| 2003/0078749 A1 | 4/2003 | Eberle et al. | |
| 2005/0147414 A1 | 7/2005 | Morrow et al. | |
| 2012/0036369 A1* | 2/2012 | Chang | G11C 7/24 713/189 |
| 2012/0102565 A1* | 4/2012 | Feraud | G06F 21/34 726/18 |
| 2012/0151121 A1* | 6/2012 | Braga | G06F 21/79 711/103 |
| 2012/0216001 A1* | 8/2012 | Ramly | G06F 21/87 711/163 |
| 2013/0036314 A1* | 2/2013 | Glew | G06F 12/1408 713/194 |
| 2014/0369495 A1* | 12/2014 | Muchsel | H04L 9/0866 380/44 |

OTHER PUBLICATIONS

Anonymous, "Data exchange token," IP.com No. IPCOM000202472D, IP.com Electronic Publication: Dec. 16, 2010, 5 pages.
Anonymous, "Secure Key Storage Technique in SRAM to Avoid Data Remanance Attacks," IP.com No. IPCOM000160182D, IP.com Electronic Publication: Nov. 5, 2007, 6 pages.
Chinnakkonda Vidyapoornachary et al., "Computer Memory Data Security", U.S. Appl. No. 14/665,029, filed Mar. 23, 2015.
List of IBM Patents or Patent Applications Treated as Related, dated Apr. 5, 2016, pp. 1-2.

\* cited by examiner

*Primary Examiner* — Ryan Bertram
(74) *Attorney, Agent, or Firm* — Heather S. Chatterton; Robert Williams

(57) ABSTRACT

A memory module determines that the memory module is connected to a memory module connector. The memory module receives the connector ID from the connector and communicates, to the connector, a memory module ID associated with the memory module. A connector-module ID token is generated using the connector ID and the memory module ID. It is determined that the connector-module ID token was not received from the connector within a predetermined time window. Data on the memory module is erased in response to not receiving the connector-module ID.

1 Claim, 5 Drawing Sheets

COMPUTER MEMORY DATA SECURITY

BACKGROUND

The present disclosure relates to computer memory, and more specifically, to computer memory data security.

Growing memory usage presents numerous data security challenges. Non-volatile memory modules present a unique challenge as data is retained when power is lost. Thus, hackers may be able to remove a memory module and obtain access to the data if it is not secured properly.

SUMMARY

According to embodiments of the present disclosure, a method for protecting memory data is disclosed. The method includes determining, by a memory module, that the memory module is connected to a memory module connector. The method further includes receiving, at the memory module, a connector ID from the connector and communicating, to the connector, a memory module ID associated with the memory module. The method further includes generating a connector-module ID token using the connector ID and the memory module ID. The method further includes determining the connector-module ID token was not received from the connector within a predetermined time window. The method further includes erasing, in response to the determining the connector-module ID token was not received, data on the memory module.

Further disclosed herein are embodiments of a computer program product for protecting memory data. The computer program product includes a computer readable storage medium having program instructions embodied therewith. The computer readable storage medium is not a transitory signal per se. The program instructions are executable by a computer to cause the computer to perform a method. The method includes determining, by a memory module, that the memory module is connected to a memory module connector. The method further includes receiving, at the memory module, a connector ID from the connector and communicating, to the connector, a memory module ID associated with the memory module. The method further includes generating a connector-module ID token using the connector ID and the memory module ID. The method further includes determining the connector-module ID token was not received from the connector within a predetermined time window. The method further includes erasing, in response to the determining the connector-module ID token was not received, data on the memory module.

Further disclosed herein are embodiments of a memory module. The memory module includes one or more memory chips, a transceiver configured to communicate with a memory module connector, and an erase controller. The erase controller is configured to detect that the transceiver failed to receive a connector-module ID token within a predetermined time window. The connector-module ID token is generated using a connector ID and a memory module ID. The erase controller is further configured to erase, in response to detecting that the transceiver failed to receive the connector-module ID token, data on at least one of the one or more memory chips.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
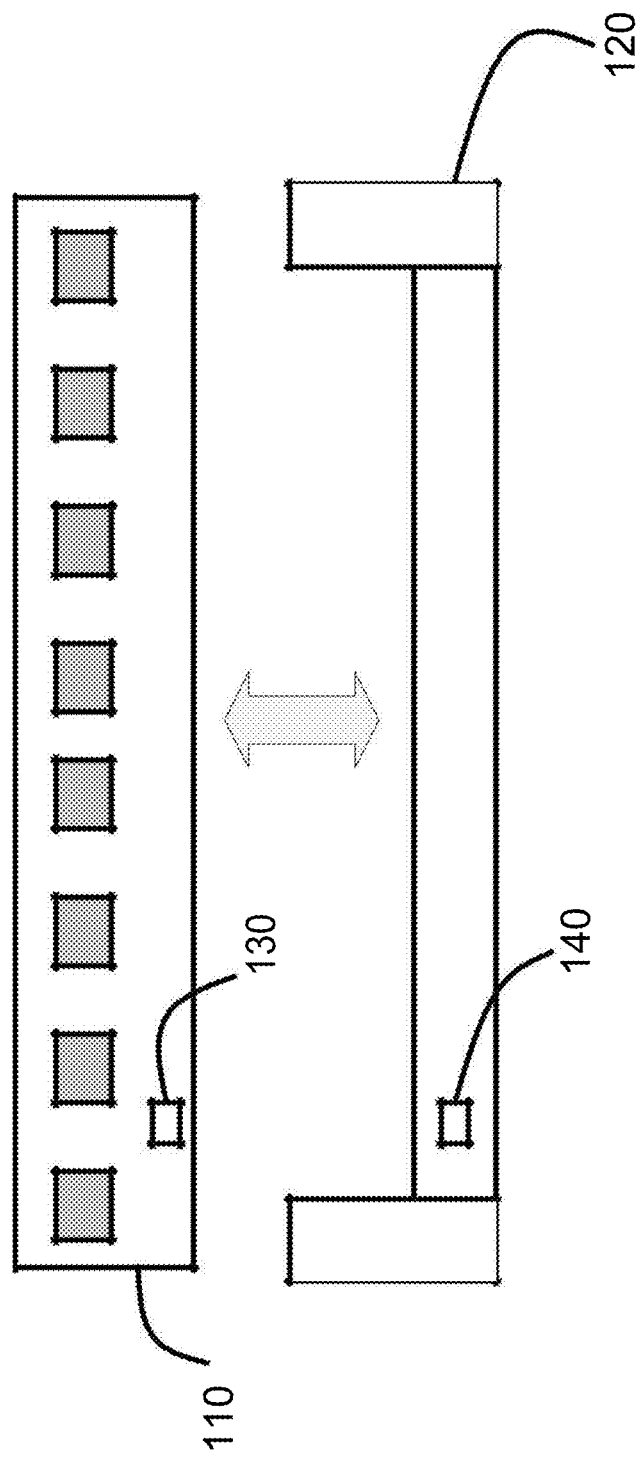
FIG. 1 depicts an example memory module and an example memory module connector configured to communicate with each other according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer memory security, and more particular aspects relate to securing data in a memory module from physical removal of the memory module. While the present disclosure is not necessarily limited to such applications, various aspects of the disclosure may be appreciated through a discussion of various examples using this context.

Embodiments of the present disclosure may provide for communication between a memory module and a memory module connector to provide security for data on the memory module. The memory module and the connector may be configured to synchronize with each other through command-response periodically. Once a memory module is inserted into the connector and bus signaling is established, a process of monitoring for removal of the memory module may begin.

The process may begin with the connector requesting a module ID (MID) from the memory module and the memory module requesting a connector ID (CID) from the connector. The MID and CID may be combined, by the memory module and the memory module connector, to form a connector-module ID (CMID) token. The memory module and connector may exchange CMID tokens within a predetermined time window through their respective transceivers. If the CMID token is not exchanged within the predetermined time window, a sync lost may be detected at both the connector and the memory module. In some embodiments, a programmable retry option may be a supplementary feature to provide flexible timeout detect.

Sync lost detected at the connector may raise an alert to the system indicating absence of the module. Sync lost detected at the memory module may trigger a data erase operation on the memory module. The memory module may be equipped with enough backup power and associated circuitry to support an erasure operation. For example, the memory module may have a battery backup and contain logic to drive some predetermined patterns one or more memory chips, such as dynamic random access memory (DRAM) chips, on the memory module to overwrite the data. In some embodiments, the predetermined patterns may be driven to a DRAM chip containing error-correcting code (ECC). Hackers may be unable to determine the read data integrity of the main data without the ECC.

The memory modules may be volatile or non-volatile memories. However, embodiments of the present disclosure may be particularly useful for protecting non-volatile memory which would typically retain data after power loss caused by, for example, removing a memory module form a connector.

Generating the CMID token may include inputting the CID and MID into an algorithm on the connector side and on the memory module. The generated CMID token may be any type of data pattern.

The memory module and connector may each have a transceiver to communicate the IDs and CMID token with each other. The transceivers may communicate using any method of communication. In some embodiments, the transceivers may be coupled wirelessly. In some embodiments, the transceivers are optically coupled.

In some embodiments, the CID is assigned to the connector by the computer system during startup of the system. This may help to prevent a hacker from identifying the CID and using it to create a CMID.

Referring to FIG. 1, an example memory module 110 and an example connector 120 configured to communicate with each other according to embodiments of the present disclosure is depicted. Memory module 110 may be any type of memory module such as a DIMM containing one or more DRAM chips. Connector 120 may be configured to receive memory module 110. Connector 120 may be configured to provide power to memory module 110 and provide communication between memory module 110 and other element of a computer system which are not shown. Memory module 110 includes a transceiver 130 configured to communicate with connector 120 via transceiver 140 on memory module connector 120. Transceivers 130 and 140 may be configured to communicate the MID, CID, and CMID token between memory module 110 and connector 120 as described herein. Memory module 110 can be slid into connector 120 as shown by the double arrow between them.

Figure 2:
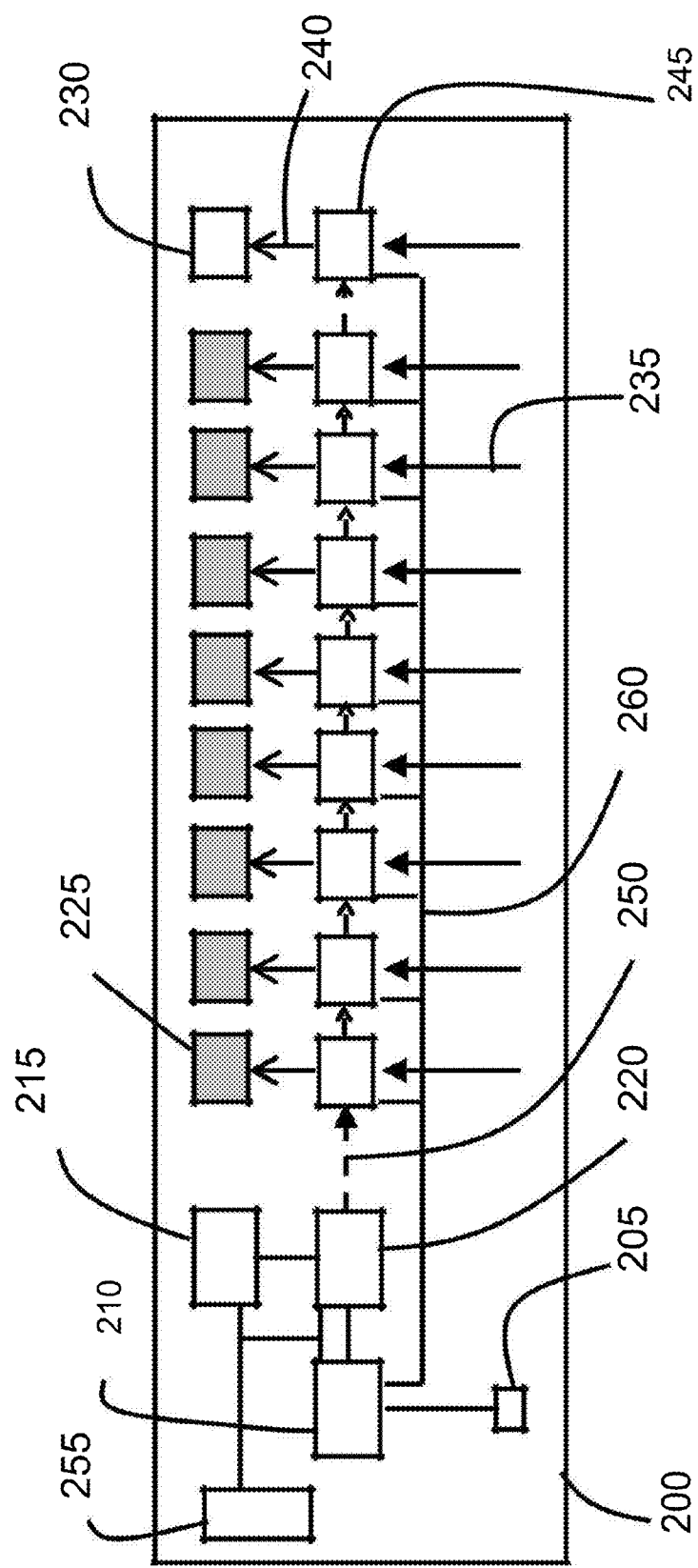
FIG. 2 depicts a block diagram of an example memory module for erasing data after detecting a sync lost.

Referring to FIG. 2, a block diagram of an example memory module 200 for erasing data after detecting a sync lost is depicted. Memory module 200 includes transceiver 205, erase controller 210, erase data pattern generator 215, driver logic 220, data DRAM 225, ECC DRAM 230, main line bus 235, bus connecting to DRAM 240, bus switch 245, erase bus 250, power backup 255, and bus switch control 260. Power backup 255 may be configured to provide power to the elements of memory module 200 when memory module 200 loses external power such as, for example, when memory module 200 is removed from a connector. Erase controller 210 may be configured to detect a sync lost event such as, for example, when transceiver 205 fails to receive the CMID token from the connector within the predetermined time window. In response to detecting the sync lost event, erase controller 210 may be further configured to switch from mainline bus 235 to erase bus 250 using bus switch control 260 to activate bus switch 245. Erase controller 210 may be further configured to use driver logic 220 to drive an erase pattern from erase pattern generator 215 to one or more of the data DRAMs 225 or ECC DRAM 230.

Figure 3:
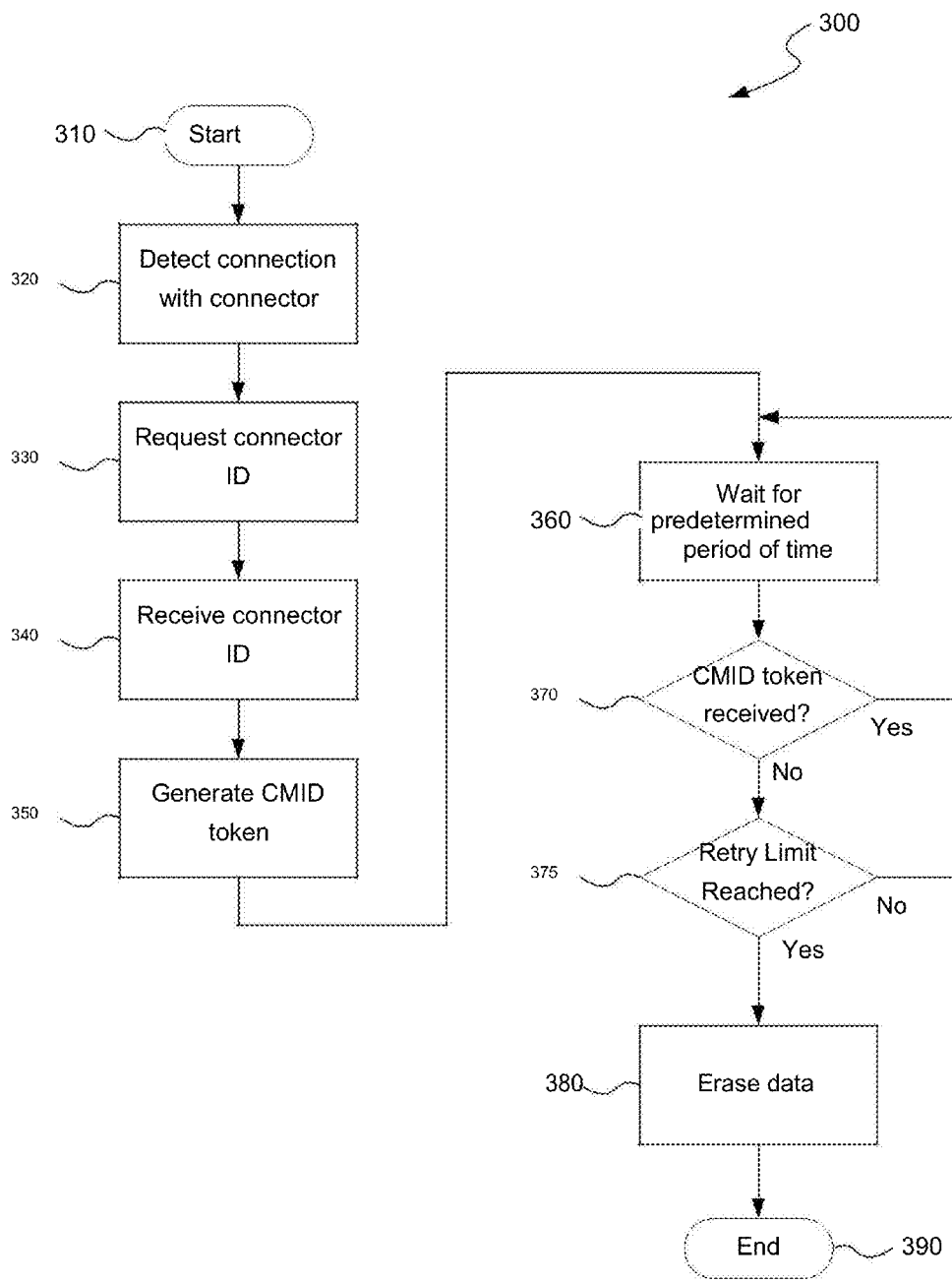
FIG. 3 depicts a flow diagram of an example method for erasing data in a memory module in response to detecting a sync lost event.

Referring to FIG. 3, a flow diagram of an example method 300 for erasing data in a memory module in response to detecting a sync lost event is depicted. Method 300 begins at block 310. At block 320, the memory module detects a connection with a connector. At block 330, the memory module requests a CID from the connector. At block 340, the memory module receives the CID. At block 350, the memory module generates a CMID token using the memory module's MID and the received CID. At block 360, the memory module waits for a predetermined period of time. At block 370, the memory module determines whether the CMID token was received from the connector within the predetermined period of time. If the CMID token was received, method 300 returns to block 360. If the CMID token was not received, method 300 proceeds to block 375. At block 375, the memory module determines whether a retry limit has been reached. This is an optional block in some embodiments which allows for retries before detecting a sync lost event. If the retry limit has not been reached, method 300 returns to block 360. If the retry limit has been reached, method 300 proceeds to block 380. At block 380, the memory module erases data on the memory module. At block 390, method 300 ends.

Figure 4:
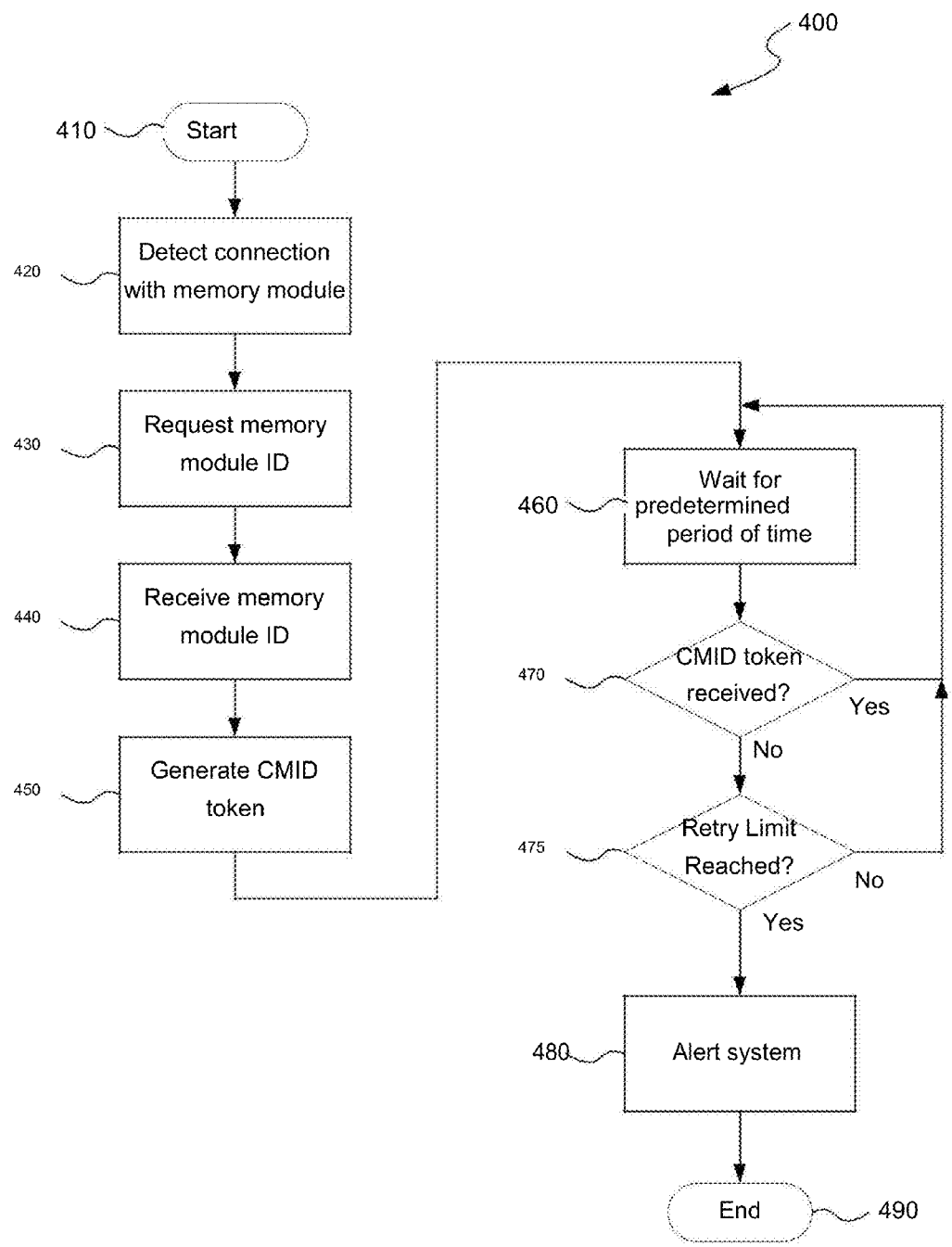
FIG. 4 depicts a flow diagram of an example method for alerting a computer system to the removal of a memory module

Referring to FIG. 4, a flow diagram of an example method 400 for alerting a computer system to the removal of a memory module is depicted. Method 400 begins at block 410. At block 420, a memory module connector detects a connection with a memory module. At block 430, the connector requests an MID from the memory module. At block 440, the connector receives the MID. At block 450, a CMID token is generated using a CID and the received MID. At block 460, the connector waits for a predetermined period of time. At block 470, it is determined whether the CMID token was received within the predetermined period of time. If the CMID token was not received, method 400 proceeds to block 475. At block 475, it is determined whether a retry limit has been reached. This is an optional block in some embodiments which allows for retries before detecting a sync lost event. If the retry limit has not been reached, method 400 returns to block 460. If the retry limit has been reached, method 400 proceeds to block 480. At block 480, the connector communicates an alert to the system indicating absence of the memory module. At block 490, method 400 ends.

Figure 5:
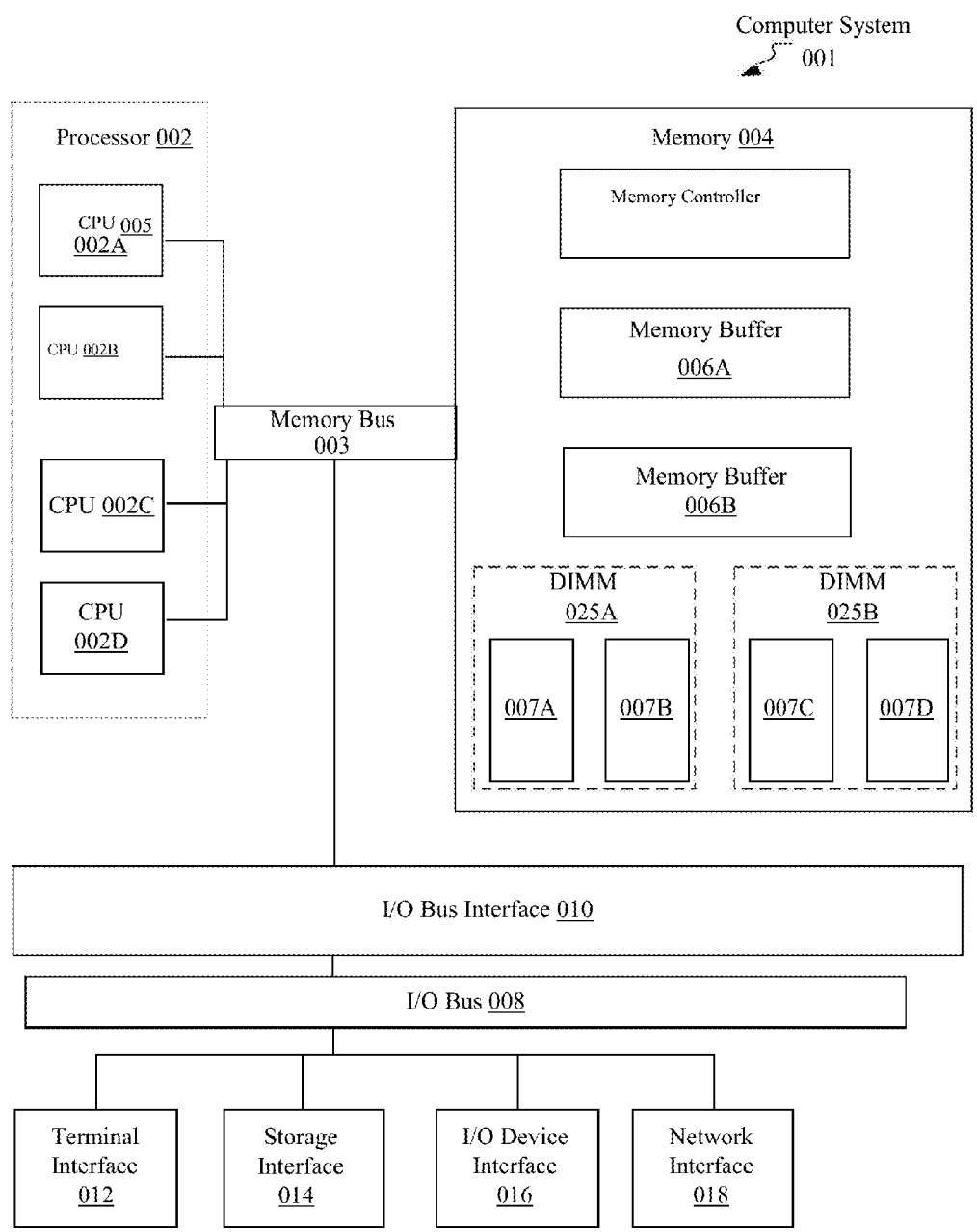
FIG. 5 depicts a high-level block diagram of an example computer system that may be used in implementing one or more of the methods, tools, and modules, and any related functions or operations described herein, in accordance with embodiments of the present disclosure.

Referring now to FIG. 5, shown is a high-level block diagram of an example computer system (i.e., computer) 001 that may be used in implementing one or more of the methods, tools, and modules, and any related functions or operations, described herein (e.g., using one or more processor circuits or computer processors of the computer), in accordance with embodiments of the present disclosure. In some embodiments, the major components of the computer system 001 may comprise one or more CPUs 002, a memory subsystem 004, a terminal interface 012, a storage interface 014, an I/O (Input/Output) device interface 016, and a network interface 018, all of which may be communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In some embodiments, the computer system 001 may contain multiple processors typical of a relatively large system; however, in other embodiments the computer system 001 may alternatively be a single CPU system. Each CPU 002 may execute instructions stored in the memory subsystem 004 and may comprise one or more levels of on-board cache.

In some embodiments, the memory subsystem 004 may comprise a random-access semiconductor memory, storage device, or storage medium (either volatile or non-volatile) for storing data and programs. In some embodiments, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but, in some embodiments, the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 004 may contain elements for control and flow of memory used by the CPU 002. This may include all or a portion of the following: a memory controller 005, one or more memory buffers 006A and 006B and one or more memory devices 025A and 025B. In some embodiments, the memory devices 025A and 025B may be dual in-line memory modules (DIMMs), which are a series of dynamic random-access memory (DRAM) chips 007A-007D (collectively referred to as 007) mounted on a printed circuit board and designed for use in personal computers, workstations, and servers. The use of DRAMs 007 in the illustration is exemplary only and the memory array used may vary in type as previously mentioned.

Although the memory bus 003 is shown in FIG. 5 as a single bus structure providing a direct communication path among the CPUs 002, the memory subsystem 004, and the I/O bus interface 010, the memory bus 003 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in some embodiments, contain multiple I/O bus interface units 010, multiple I/O buses 008, or both. Further, while multiple I/O interface units are shown, which separate the I/O bus 008 from various communications paths running to the various I/O devices, in other embodiments some or all of the I/O devices may be connected directly to one or more system I/O buses.

In some embodiments, the computer system 001 may be a multi-user mainframe computer system, a single-user system, or a server computer or similar device that has little or no direct user interface, but receives requests from other computer systems (clients). Further, in some embodiments, the computer system 001 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 001. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A dual in-line memory module comprising:
    a plurality of dynamic random access memory chips, at least one of the plurality of dynamic random access memory chips being an error-correcting code dynamic random access memory chip;
    a module transceiver configured to communicate with a memory module connector and receive a connector-module ID token from the connector, the memory module connector configured to receive the memory module, the memory module connector comprising a connector transceiver for communicating with the module transceiver, the connector-module ID token generated using a connector ID associated with the memory module connector and a memory module ID associated with the memory module, the connector ID generated during startup of a system comprising the memory module connector;
    a backup battery configured to provide power to circuitry on the memory module;
    an erase pattern generator; and
    an erase controller, the erase controller included in the circuitry on the memory module and configured to:
        detect that the module transceiver failed to receive the connector-module ID token from the connector transceiver within a predetermined time window, the predetermined time window including a first time window and a predetermined number of retry time windows; and
        erase, in response to detecting that the module transceiver failed to receive the connector-module ID token from the connector transceiver, data on at least one of the one or more dynamic random access memory chips by driving predetermined patterns retrieved from the erase pattern generator to the error-correcting code dynamic random access memory chip.

* * * * *